United States Patent

Milliken et al.

[11] 3,732,670
[45] May 15, 1973

[54] HAY CONDITIONER ROLL

[75] Inventors: Paul E. Milliken, Massillon, Ohio; Larry L. Bell, Hanover Park, Ill.

[73] Assignee: The Goodyear Tire & Rubber Company, Akron, Ohio

[22] Filed: July 14, 1971

[21] Appl. No.: 162,553

Related U.S. Application Data

[63] Continuation of Ser. No. 874,551, Nov. 5, 1969, abandoned.

[52] U.S. Cl. ..................56/1, 56/DIG. 1, 130/5 R
[51] Int. Cl. ..................................................A01d
[58] Field of Search..................56/1, DIG. 1, 110; 130/5 J

[56] References Cited

UNITED STATES PATENTS

| | | | |
|---|---|---|---|
| 2,704,078 | 3/1955 | Scranton | 130/5 J |
| 3,488,929 | 1/1970 | Hale | 56/DIG. 1 |
| 2,811,819 | 11/1957 | Heth | 56/DIG. 1 |
| 2,535,485 | 12/1950 | Cover | 56/DIG. 1 |
| 3,513,645 | 5/1970 | Garrett et al. | 56/DIG. 1 |

Primary Examiner—Antonio F. Guida
Attorney—F. W. Brunner, et al.

[57] ABSTRACT

A molded rubber roll for use in conjunction with one or more additional rolls of similar construction on a hay conditioning machine. The roll has a plurality of circumferential rows of spaced apart radially outwardly extending lugs which intermesh with similar spaced apart lugs on a similar roll when a pair of such rolls are mounted in parallel relationship on a hay conditioning machine. The lugs may be of rectangular shape or may be molded in other shapes, such as diamonds, hexagons, parallelograms or X or L shapes. Some configurations may be made by molding the roll in one continuous length in its finished form. Other configurations may be made by molding or extruding a long length of axially ribbed stock having an axially splined center hole therethrough, then cutting the piece of stock transversely into separate segments and mounting the segments on a spline shaft with each segment being rotated circumferentially with respect to the adjacent segment so that the lugs of one segment are circumferentially offset from the lugs of the adjacent segment.

20 Claims, 14 Drawing Figures

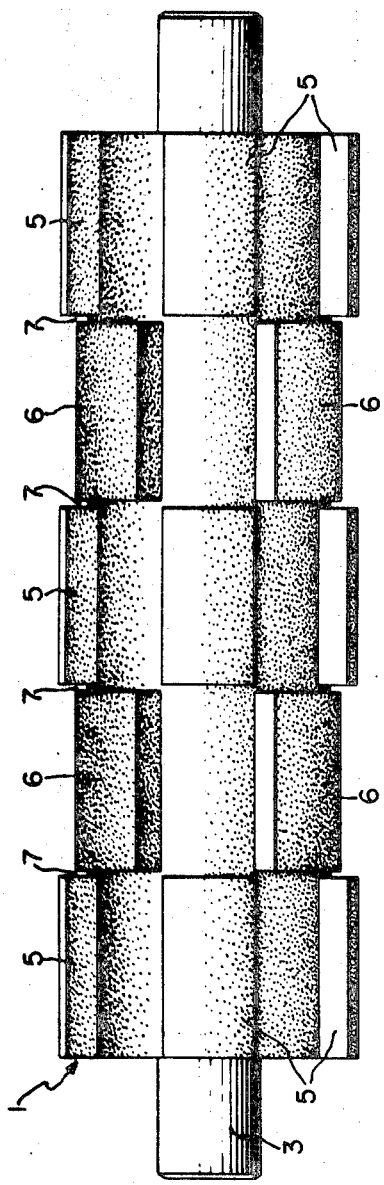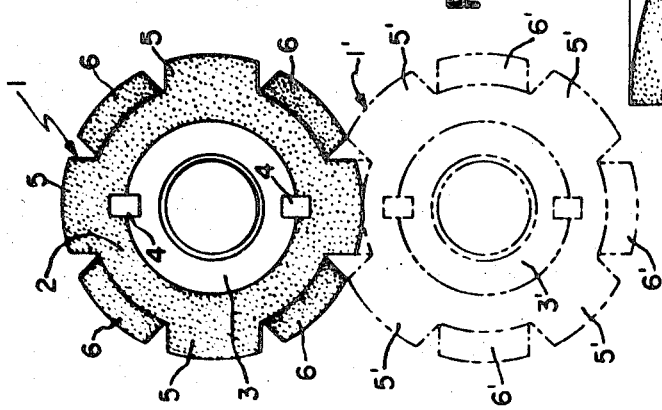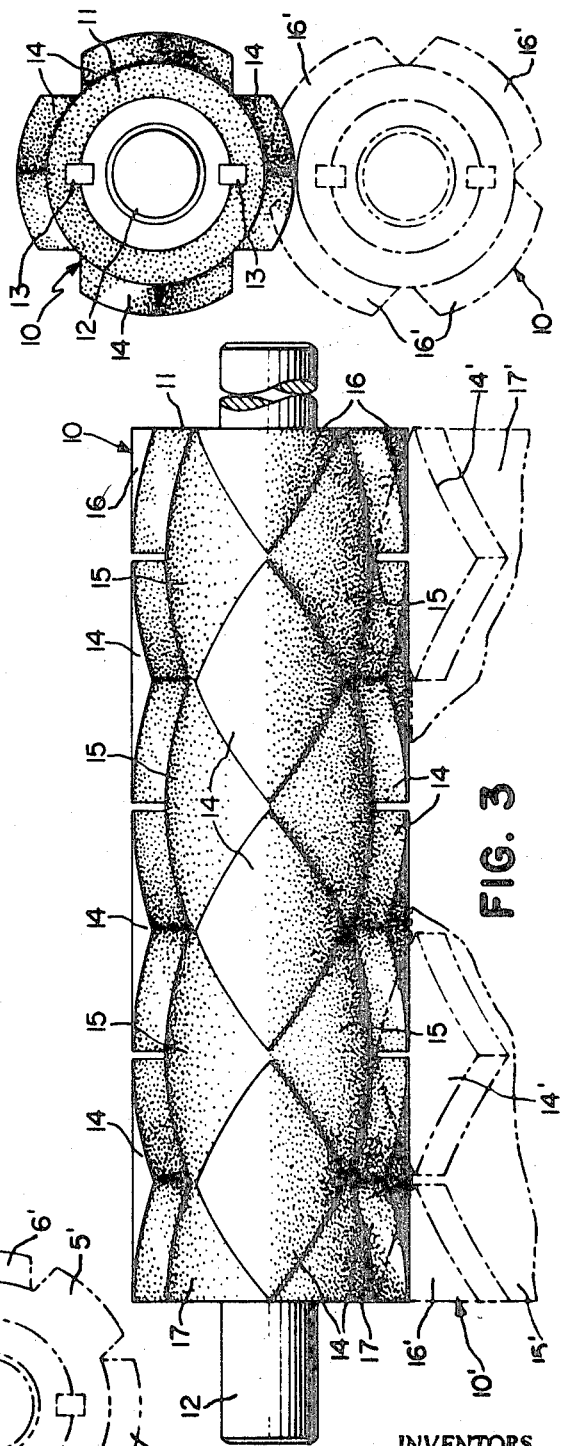

INVENTORS
PAUL E. MILLIKEN
LARRY L. BELL
ATTORNEY

INVENTORS
PAUL E. MILLIKEN
LARRY L. BELL
BY
ATTORNEY

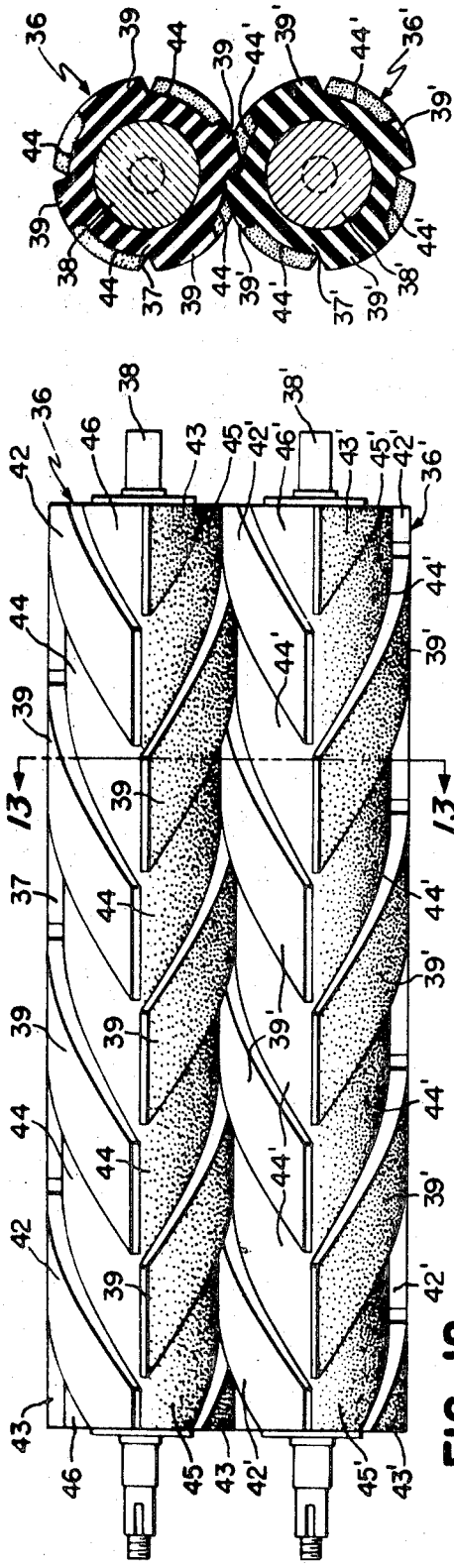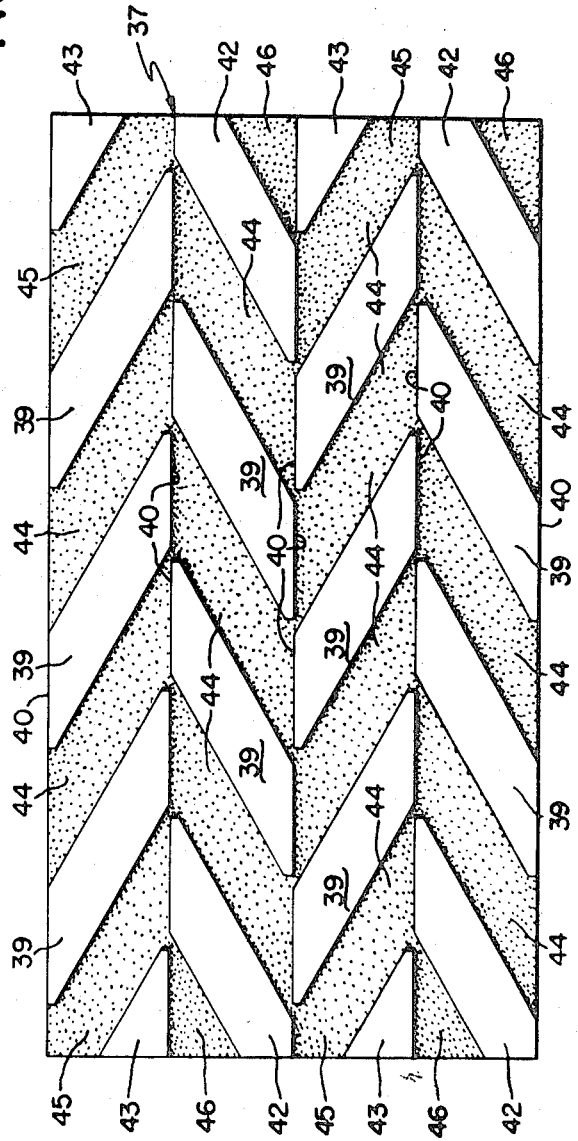
INVENTORS
PAUL E. MILLIKEN
LARRY L. BELL
ATTORNEY 3,732,670

HAY CONDITIONER ROLL

This is a continuation of my copending application Ser. No. 874,551 filed Nov. 5, 1969 now abandoned.

This invention relates to a molded rubber roll for use in conjunction with one or more additional rolls of similar construction on a hay conditioning machine.

BACKGROUND OF THE INVENTION

The general construction and operation of hay conditioning machines is well described in U.S. Pat. No. 2,811,819 and U.S. Pat. No. 2,921,426, both issued to S. C. Heth, and will not be repeated herein since the invention claimed in the present application involves a roll structure for use in the machines of the general type described in the Heth patent. Various types of rolls have been used on crop conditioning machines in the past. Most rolls were metal until recently when rubber rolls were developed. Some rolls have been of a unitary molded rubber construction and others have been segmented. Still others have been made from a series of discs cut from tire carcasses or similar material and assembled under high pressure on a shaft to form the roll. Rolls have been made with many types of surface configurations, such as ribs, grooves and other types of surface variations in an attempt to better perform the function of crimping and/or crushing hay or other similar crops passing between a pair of such rolls. Many of the prior rib or groove configurations have not provided the proper conditioning of both the hay stocks and leaves that is necessary for uniform drying of the hay. Difficulty has also been encountered with breaking and distortion of the ribs on the rolls, particularly when stones and foreign objects are drawn through the rolls. In an attempt to provide more uniform crushing and crimping action, rolls have been developed with intermeshing teeth or ribs. Typical examples of such prior art rolls are illustrated in U.S. Pat. No. 2,535,485 issued to R Cover and U.S. Pat. No. 2,811,819 issued to S. C. Heth. These rolls have contained ribs which run throughout the length of the roll in an axial direction or are arranged in a spiral around the roll. Two of the main problems encountered by prior art devices have been that of excessive vibration and the tendency of the crop to be carried to one end of the rolls while passing therethrough and become wrapped around the shaft which carries the rolls.

OBJECTS OF THE INVENTION

One important object of this invention is to provide a roll structure which both minimizes the vibration of the rolls and prevents axial movement of the hay across the rollers, thereby causing it to wrap around the shafts at the ends of the rollers.

Another object of the invention is to provide a roll structure which uniformly crimps and crushes all parts of the hay or other crops being conditioned, regardless of the stock diameter or leaf structure.

A further object of the invention is to provide a roll with a greater overall length of crimping edges than previous roll configurations.

Still another important object of the invention is to provide a more durable roll having a lug configuration which is less subject to breakage and distortion. These and other objects of the invention will become more fully apparent as the description proceeds in the following specification and the accompanying drawings.

BRIEF DESCRIPTION OF THE DRAWINGS

FIG. 1 is a side view of one roller showing one embodiment of the invention;

FIG. 2 is an end view of the embodiment shown in FIG. 1 showing two rollers in intermeshing relationship;

FIG. 3 is a side view of another embodiment of the invention;

FIG. 4 is an end view of the embodiment shown in FIG. 3 showing two rollers in intermeshing relationship;

FIG. 12 is a side view of another embodiment of the invention showing two intermeshing rolls;

FIG. 13 is a cross-sectional view taken at line 13—13 of FIG. 12; and

FIG. 14 is a flat development of the lug pattern of the embodiment shown in FIGS. 12 and 13.

DESCRIPTION OF THE PREFERRED EMBODIMENTS

Figure 5:
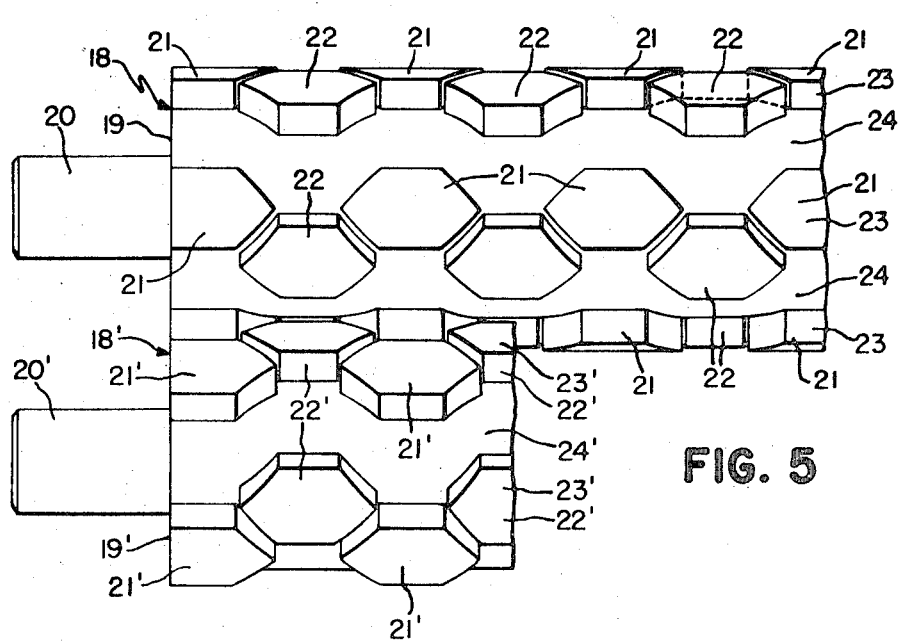
FIG. 5 is a fragmentary side view of another embodiment of the invention showing two rollers in intermeshing relationship.
Figure 6:
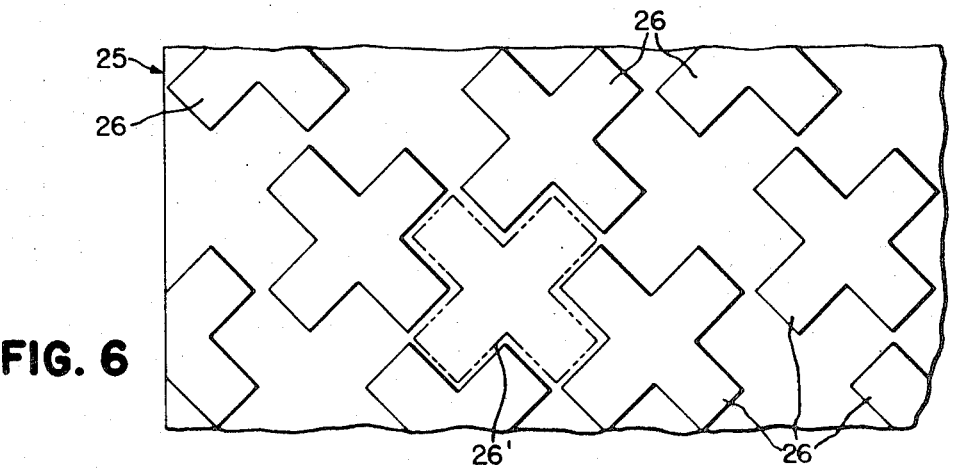
FIG. 6 is a fragmentary flat development of another embodiment of the invention showing a particular lug configuration.
Figure 7:
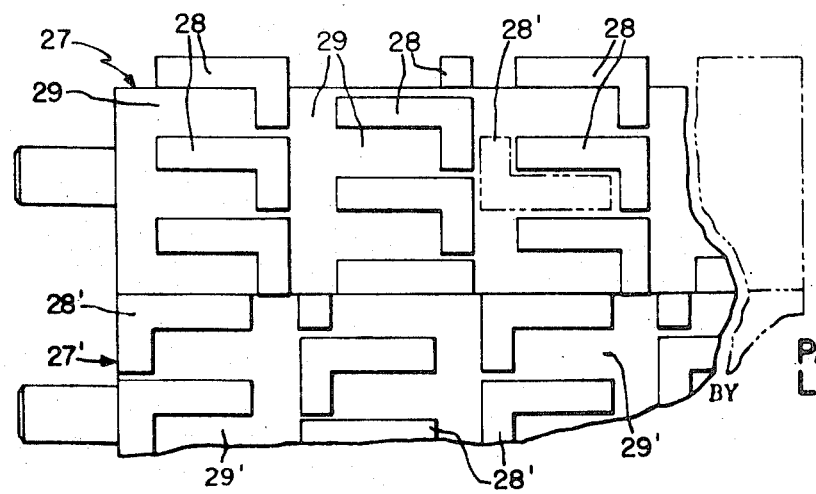
FIG. 7 is a fragmentary side view of two rollers illustrating another embodiment of the invention.
Figure 8:
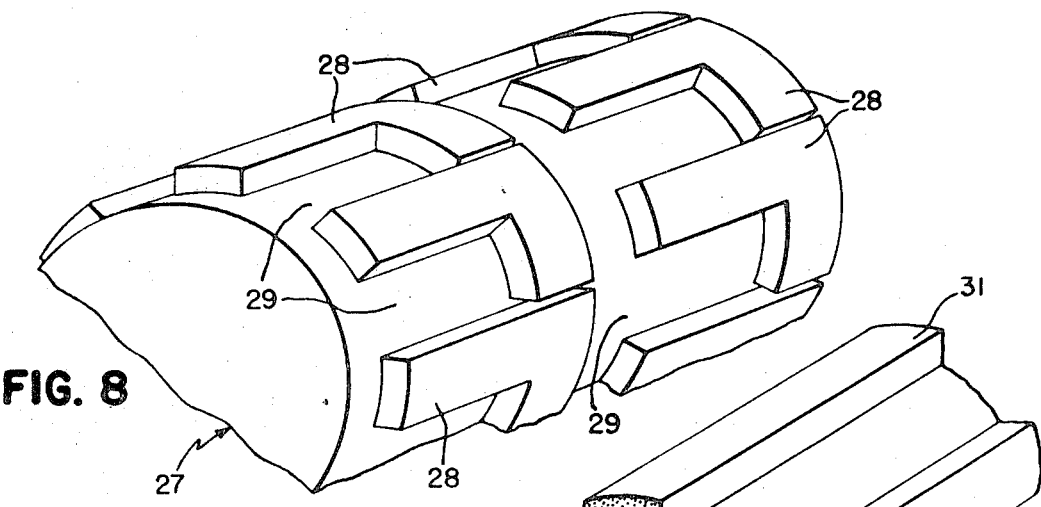
FIG. 8 shows a fragmentary perspective view of one roller having the same lug configuration as that illustrated in FIG. 7.
Figure 9:
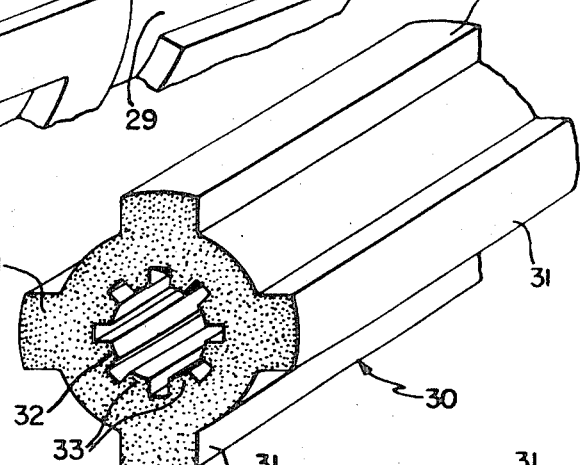
FIGS. 9 through 11 show the steps in one method of manufacturing a roll having a lug configuration similar to the embodiment shown in FIGS. 1 and 2.
Figure 10:
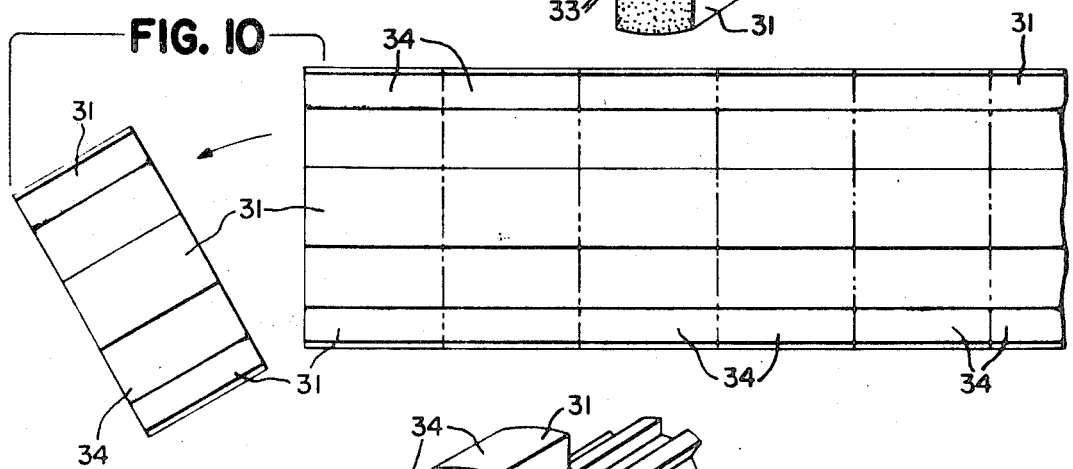
Figure 11:
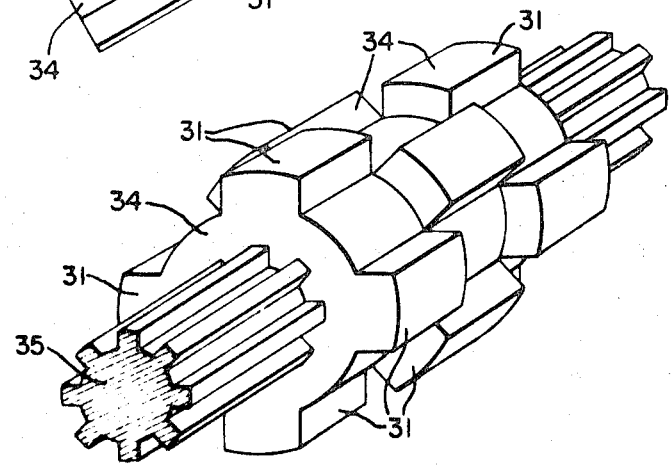

Referring now to FIGS. 1 and 2, a roll is indicated generally by the numeral 1 and has an elongated cylindrical elastomeric body portion 2 which is keyed on an axial core or shaft 3 by a pair of keys 4. It will also be understood that the body portion 2 may, if desired, by molded directly on the center core. The body portion 2 has a plurality of rows of radially outwardly extending lugs 5 arranged in circumferential rows around the body portion 2. Between each of the circumferential rows of lugs 5 is a circumferential row of lugs 6 which are offset circumferentially from the lugs 5. As may be seen in FIGS. 1 and 2, the lugs 6 are centered circumferentially between the lugs 5. In other words, every other row of circumferential lugs is circumferentially offset from the circumferential row on either side thereof. Both the rows of lugs 5 and 6 have the lugs spaced apart from each other a sufficient distance to provide a space for intermeshing with similar lugs on a substantially identical roll when it is positioned in parallel relationship therewith as illustrated in FIG. 2. The roll shown in broken lines in FIG. 2 is indicated by the numeral 1' and the various parts which are similar to the parts of the roll 1 are indicated by similar numerals but are designated with a prime ('). For example, the lugs 5 of the roll 1 intermesh with the lugs 5' of the roll 1'. The lugs 6 intermesh with the lugs 6'. A clearance space 7 is provided between each circumferential row of lugs as shown in FIG. 1. This is necessary since each end of the lugs must be sufficiently offset from the next adjacent lug to permit intermeshing with the lugs of the adjacent roller. By providing offset lugs as illustrated in this embodiment with the corners of each lug spaced in close proximity to the adjacent corners of the next adjacent lugs, the outer peripheral surface of the lugs tend to provide more continuous surface contact with the bottom of the spaces on the adjacent roller and thereby minimize the vibration which is normally caused by rolls using continuous axial ribs. In addition, the design of the present roll structure does not cause axial movement of the hay toward one end of the rollers but permits the hay to pass transversely between the rollers without substantial axial movement in either direction. Referring now to FIGS. 3 and 4, a roll 10 is positioned parallel to and in intermeshing relationship with a roll 10' as indicated in broken lines in FIG. 4. The intermeshing principal of the rolls 10 and 10' is, of course, similar to that of the rolls 1 and 1' previously described, the main difference being that the lugs of rolls 10 and 10' are diamond-shaped rather than rectangular-shaped. For the purpose of identifying the parts, the roll 10 has an elastomeric body portion 11 keyed to a center core or shaft 12 by keys 13. Extending radially outwardly from the periphery of the body portion 11 is a plurality of diamond-shaped lugs 14 which are arranged in circumferential and axial rows. Between every 4 adjacent lugs is a diamond-shaped space 15 which is large enough to receive a mating lug 14' from the adjacent intermeshing roll 10'. At one end of the roll 10 is a circumferential row of triangular-shaped lugs 16 which are formed in the shape of half of one of the diamond-shaped lugs 14. At the opposite end of the roll is a circumferential row of triangular-shaped spaces 17 which intermesh with triangular lugs 16' from the opposite roll 10'. In other words, the rolls 10 and 10' may be molded in an identical mold and one of the rolls may be reversed by turning it end for end with respect to the other roll to provide the proper intermeshing relationship between the lugs 16 and the spaces 17'. Due to the manner in which the diamond-shaped lugs overlap each other, both circumferentially and axially, this provides a smooth transition of surface contact between the lugs and spaces of each adjacent roll and tends to minimize the vibration which is caused by the use of continuous axial lugs. The diamond-shape lug pattern also prevents undesirable axial travel of the hay toward one end of the rolls which thereby causes the hay to wrap around the ends of the shafts and results in uneven crushing and crimping of the hay. FIG. 5 shows another embodiment of the invention in which a pair of rollers 18 and 18' have body portions 19 respectively surrounding center shafts 20 and 20'. The body portion 19 has a plurality of circumferential rows of lugs 21 which are spaced apart circumferentially and axially from each other. A plurality of circumferential rows of lugs 22 are spaced circumferentially and axially from each other and are positioned to overlap substantially half of a pair of adjacent lugs 21 thereby lying in a circumferentially offset relationship to the lugs 21. The lugs 21 and 22 combine to form a series of zig-zag rows 23 of the lugs and a zig-zag space or groove 24 between each of the rows 23. The roll 18' has a similar lug configuration formed by the lugs 21' and 22' which are so positioned to intermesh with the lugs 21 and 22 of the roll 18. The lugs of one roll, of course, extend into the grooves or spaces between the lugs of the adjacent roll. FIG. 6 shows a single roll 25 having a plurality of X-shaped lugs 26 spaced apart axially and circumferentially from each other a sufficient distance to provide space for intermeshing lugs 26' of a mating adjacent roll not shown to extend into each space between the lugs as indicated by the X-shaped configuration shown by the broken line identified as 26'. The other spaces between the lugs 26 are of similar size and shape to receive similar X-shaped lugs 26' from the adjacent roll. Referring now to FIGS. 7 and 8, a pair of rolls 27 and 27' have a plurality of L-shaped lugs 28 and 28', respectively, arranged in circumferential rows with the lugs of one row being circumferentially offset from the lugs of the next adjacent row. Between each of the lugs 28 are L-shaped spaces 29 which intermesh with the lugs 28' of the adjacent roll 27'. Conversely, the spaces 29' of the roll 27' intermesh with the lugs 28 of the roll 27. FIG. 8 shows more clearly the lug configuration of each roll in a perspective view. To provide proper crushing and crimping, the lugs of any of the embodiments previously described have substantially parallel sides to provide a series of corners on the lugs which are substantially 90° angles or slightly more than 90°. If the angles of the corners are too large, the corners will not be sufficiently sharp and will not crimp the hay with maximum efficiency. Other shapes of lugs than those shown in the previous embodiments may also be used without departing from the invention. FIG. 9 shows an elastomeric body portion 30 from which a hay conditioner roll may be made. The body 30 is made with four radially outwardly extending ribs 31 uniformly spaced from each other around the circumference of the body 30 and running axially along the length thereof. An axial hole 32 having spline teeth 33 extends throughout the length of the body 30. The body may be made by molding or extruding. As shown in FIG. 10, the body 30 may be cut transversely into short segments 34 which in turn are placed on a splined shaft 35 as shown in FIG. 11 with each segment 34 being circumferentially offset from the next adjacent segment, thereby providing a roller having a lug configuration similar to that shown in FIGS. 1 and 2. In order to provide necessary clearance between adjacent lugs to permit intermeshing of the lugs of one roll with another, an axial spacer may be placed between each of the segments 34 to cause the adjacent ends of the ribs or lugs 31 to be spaced apart, as shown by the space 7 in FIG. 1. By providing twice as many spline teeth 33 in the hole 32 as there are ribs 31, the segments 34 may be easily positioned in the desired circumferential offset position on the splined shaft 35 with the lugs of each segment 34 being positioned circumferentially midway between the lugs of the next adjacent segments 34.

Another embodiment of the invention is illustrated in FIGS. 12 through 14 in which a role is indicated by the numeral 36 and the mating roll is designated by the numeral 36'. All the equivalent parts of the roll 36' bear the same numerals as the comparable parts of the roll 36 but are distinguished by the designation of prime (') after the numeral. The roll 36 has an elongated elastomeric body portion 37 surrounding a center shaft 38 in the same manner as that previously described with respect to some of the earlier embodiments. The body portion 37 has a plurality of integral lugs 39 arranged in axial rows and extending radially outwardly from the body portion 37. The lugs 39 are parallelogram-shaped with two sides 40 lying parallel to the longitudinal axis of the roll and the two other sides 41 inclined at an oblique angle with respect to the roll axis. As may best be seen in the flat development view shown in FIG. 14, each of the rolls 36 has four axial rows of the lugs 39 with the lugs of each adjacent axial row being inclined at an opposite angle to the lugs of the previous row. In other words, two of the rows of lugs 39 are inclined in one direction and two of the rows are inclined in the opposite direction. In addition to the parallelogram-shaped lugs, there is located at each end of the roll, lugs which are fragmentary portions of the parallelogram-shaped lugs 39. For example, the lugs 42 are similar to the lugs 39 except that one end has been truncated. The lugs 43 form an even smaller fragment of the parallelogram and are a triangular shape. Between each of the lugs 39 is a parallelogram-shaped space 44 which is of the proper size and angle of inclination to receive in intermeshing relationship, one of the lugs 39' on the opposite roll 36'. Likewise, the lugs 39 on the roll 36 intermesh with similar spaces 44' on the roll 36', as shown in FIGS. 12 and 13. The truncated lugs 42 and 43 have comparable shaped spaces 45 and 46 which are designated as 45' and 46' on the roller 36'. These comparable spaces provide for proper intermeshing of the truncated lugs 42 and 43 at the ends of the rolls. It may be seen that by using a plurality of relatively short lugs rather than continuous ribs as have been used in prior art devices, greater length of crimping edge surface is provided because of the additional edges on each lug.

Various minor modifications may be made in the lug configurations shown herein without departing from the scope of the invention.

We claim:

1. A roll assembly for use on a hay conditioning machine comprising:
   A. a pair of substantially identical intermeshing rolls disposed in adjacent parallel relationship, each of said rolls comprising:
      1. an elongated cylindrical elastomeric body portion,
      2. a plurality of rows of lugs, each of such rows comprising a plurality of spaced apart integral lugs extending radially outwardly from the periphery of the body portion,
      3. said lugs lying in both axial and circumferential rows,
      4. the lugs of each roll being positioned both axially and circumferentially to extend into spaces between lugs of the other roll as the rolls rotate to simultaneously crush and crimp hay passing therebetween.

2. The roll assembly of claim 1 wherein the top of each lug on one roll contacts the surface of the opposite roll in a space between adjacent lugs of said opposite roll.

3. The roll assembly of claim 1 wherein the lugs of each circumferential row are offset circumferentially from the lugs of the next adjacent circumferential row.

4. The roll assembly of claim 1 wherein the lugs are rectangular.

5. The roll assembly of claim 1 wherein the lugs are diamond shaped.

6. The roll assembly of claim 1 wherein the lugs are X shaped.

7. The roll assembly of claim 1 wherein the lugs are hexagonal.

8. The roll assembly of claim 1 wherein the lugs are L shaped.

9. The roll assembly of claim 1 wherein the lugs are parallelogram shaped.

10. The roll assembly of claim 1 wherein the lugs of each circumferential row are in axial alignment with the lugs of all the other circumferential rows.

11. The roll assembly of claim 1 in which the elastomeric body portion of each roll is molded on an axial core.

12. The roll assembly of claim 1 in which the elastomeric portion of each roll is molded with an axial opening therethrough with at least one radially inwardly facing key way in the opening for receiving a keyed center core therein.

13. The roll assembly of claim 12 wherein each roll is a plurality of separate segments and assembled in abutting end-to-end relationship on an axial center core.

14. The roll assembly of claim 13 wherein each segment has a plurality of radially inwardly facing key ways each of which may be mated with any one of the keys on the center core depending upon the circumferential position in which the segment is placed.

15. A hay conditioner roll for use in intermeshing relationship with another roll of substantially identical peripheral surface configuration comprising:
   A. a rigid center core;
   B. an elastomeric body portion;
   C. a plurality of rows of lugs, each of such rows comprising a plurality of spaced apart integral lugs extending radially outwardly from the body portion;
   D. said lugs being arranged in circumferential rows;
   E. the lugs of each row being spaced apart circumferentially a sufficient distance to provide a space for similar intermeshing lugs from one adjacent roll; and
   F. the lugs of each circumferential row being in circumferential overlapping relationship with at least part of the lugs of the adjacent circumferential row on the other roll when both rollers are in intermeshing relationship.

16. A hay conditioner roll as claimed in claim 15 wherein the lugs of substantially half of the circumferential rows are in axial alignment with each other and the lugs of the rest of the circumferential rows are in axial alignment with each other and are circumferentially positioned half way between the lugs of the adjacent circumferential rows.

17. A roll assembly for use on a hay conditioning machine comprising:
   A. a pair of substantially identical intermeshing rolls disposed in adjacent parallel relationship, each of said rolls comprising:
      1. an elongated cylindrical elastomeric body portion,
      2. a plurality of axial rows of lugs, each of such rows comprising a plurality of spaced apart integral lugs extending radially outwardly from the periphery of the body portion,
      3. the lugs of each roll being positioned thereon to extend into spaces between lugs of the other roll as the rolls rotate to simultaneously crush and crimp hay passing therebetween,
      4. the lugs of each roll being parallelogram shaped with two sides of each lug being substantially parallel to the roll axis and the other two sides being inclined at an oblique angle to the roll axis.

18. A roll assembly as claimed in claim 17 wherein the oblique sides of the lugs in each axial row are inclined at an opposite angle to the oblique sides of the lugs of the next adjacent axial row on the same roll.

19. A roll assembly for use on a hay conditioning machine comprising:
   A. a pair of substantially identical intermeshing rolls disposed in adjacent parallel relationship, each of said rolls comprising:
      1. an elongate cylindrical elastomeric body portion,
      2. a plurality of rows of lugs, each of such rows comprising a plurality of spaced apart integral lugs extending radially outwardly from the periphery of the body portion,
      3. the lugs of each roll lying in two series of rows,
      4. the rows of one series intersecting with the rows of the other series,
      5. the lugs of each roll being positioned to extend into spaces between lugs of the other roll as the rolls rotate to simultaneously crush and crimp hay passing therebetween.

20. A roll assembly for use on a hay conditioning machine comprising:
   A. a pair of substantially identical intermeshing rolls disposed in adjacent parallel relationship, each of said rolls comprising:
      1. an elongated cylindrical elastomeric body portion,
      2. a plurality of rows of lugs, each of such rows comprising a plurality of spaced apart integral lugs extending radially outwardly from the periphery of the body portion,
      3. the lugs of each roll being positioned to extend into spaces between lugs of the other roll as the rolls rotate to simultaneously crush and crimp hay passing therebetween,
      4. each lug having a plurality of sides joining at a plurality of corners, and
      5. at least part of the corners of each lug spaced in close proximity to the adjacent corners of the next adjacent lugs.

* * * * *